US012283773B2

(12) United States Patent
Hughes

(10) Patent No.: US 12,283,773 B2
(45) Date of Patent: Apr. 22, 2025

(54) TAP PLUGS CONFIGURED TO ENSURE THREAD-TO-THREAD CONTACT BEFORE HOUSING-TO-HOUSING CONTACT

(71) Applicant: Hubbell Incorporated, Shelton, CT (US)

(72) Inventor: David Charles Hughes, Aiken, SC (US)

(73) Assignee: Hubbell Incorporated, Shelton, CT (US)

( * ) Notice: Subject to any disclaimer, the term of this patent is extended or adjusted under 35 U.S.C. 154(b) by 303 days.

(21) Appl. No.: 17/724,556

(22) Filed: Apr. 20, 2022

(65) Prior Publication Data

US 2022/0344868 A1 Oct. 27, 2022

Related U.S. Application Data

(60) Provisional application No. 63/178,369, filed on Apr. 22, 2021.

(51) Int. Cl.
*H01R 13/631* (2006.01)
*H01R 13/622* (2006.01)

(52) U.S. Cl.
CPC ......... *H01R 13/631* (2013.01); *H01R 13/622* (2013.01)

(58) Field of Classification Search
CPC ..... H01R 11/26; H01R 13/631; H01R 13/622
See application file for complete search history.

(56) References Cited

U.S. PATENT DOCUMENTS 4,354,721 A * 10/1982 Luzzi ..................... H01R 13/53 439/306
4,722,694 A * 2/1988 Makal .................... H01R 13/53 439/279
4,779,341 A 10/1988 Roscizewski
4,857,021 A 8/1989 Boliver et al.
4,958,676 A * 9/1990 Kuntz ................... B29C 45/262 249/59
5,698,831 A 12/1997 Abdelgawad et al.
6,520,795 B1 * 2/2003 Jazowski ................. H01R 4/56 439/801
6,744,255 B1 * 6/2004 Steinbrecher ............ H01R 4/66 361/107
7,950,939 B2 * 5/2011 Hughes .................. H01R 13/53 439/181

(Continued)

OTHER PUBLICATIONS

International Search Report and Written Opinion for corresponding International (PCT) application No. PCT/US22/25453, 8 pages, dated Aug. 2, 2022.

*Primary Examiner* — Marcus E Harcum
(74) *Attorney, Agent, or Firm* — Ruggiero McAllister & McMahon LLC

(57) ABSTRACT

A tap plug for engaging a conductor lug and a stud is provided. The tap plug includes a housing, a first member, and a second member. The housing has an inner bore defining a longitudinal axis. The first member is in the inner bore and is rotatable with respect to the housing about the longitudinal axis. The first member has an external thread at a first end, where the external thread engages the conductor lug. The second member is rotatable with respect to the housing about the longitudinal axis and has an internal thread at the first end. The first end is open so that the internal thread can engage the stud.

16 Claims, 8 Drawing Sheets

(56) References Cited

U.S. PATENT DOCUMENTS

| | | | | |
|---|---|---|---|---|
| 7,950,940 | B2 * | 5/2011 | Hughes | H01R 13/53 439/181 |
| 7,958,631 | B2 * | 6/2011 | Hughes | H02G 15/18 29/857 |
| 8,641,434 | B2 * | 2/2014 | Siebens | H01R 13/53 439/364 |
| 9,350,123 | B2 * | 5/2016 | Siebens | H01R 4/58 |
| 9,362,663 | B2 * | 6/2016 | Maroney | H01R 13/658 |
| 10,378,576 | B2 * | 8/2019 | De France | F16B 31/028 |
| 2001/0018281 | A1 | 8/2001 | Royer | |
| 2003/0027452 | A1 | 2/2003 | Jazowski | |

* cited by examiner

TAP PLUGS CONFIGURED TO ENSURE THREAD-TO-THREAD CONTACT BEFORE HOUSING-TO-HOUSING CONTACT

CROSS REFERENCE TO RELATED APPLICATIONS

This application claims the benefit of U.S. Application 63/178,369 filed Apr. 22, 2021, the contents of which are incorporated by reference herein.

BACKGROUND

1. Field of the Invention

The present disclosure relates to tap plugs. More specifically, the present disclosure relates to tap plugs used in power distribution systems for safely connecting and disconnection high voltage cables.

2. Description of Related Art

Tap plugs are known and generally provide a tap to allow for testing of the electrical properties of the connection inside the plug.

Tap plugs are also known and are often used in combination with elbow or T-body connectors to connect line conductors to electric devices such as, but not limited to switchgear, transformers, and others. In use, the T-body has a first leg that receives a lug of the conductor and a second leg that is connected to the electric device. The tap plug is installed in the third leg of the T-body. The load reducing tap plug has the tap to allow for testing of the connection between the conductor and the electric device at a reduced load.

For example, in an application where the T-body is used to connect a 600 amp conductor to an electric device, the load reducing tap plug reduces the 600 amp load to 200 amps at the testing taps. In this manner, the load reducing tap plug allows for testing of the connection between the conductor and the electric device at a significantly lower load.

It has been determined by the present disclosure that the prior art tap plugs leave much room for improvement in areas including, but not limited to, the cost to manufacture, the ease of retrofitting prior installations, the ability to be used in high torque applications, the suitability for 900 amp applications, the ability to be installed using a hotstick, the ability to be easily disassembled, and others.

Accordingly, there is a need for tap plugs that overcome, alleviate, and/or mitigate one or more of the aforementioned and other deleterious effects of the prior art.

SUMMARY

A tap plug for engaging a conductor lug and a stud is provided. The tap plug includes a housing, a first member, and a second member. The housing has an inner bore defining a longitudinal axis. The first member is in the inner bore and is rotatable with respect to the housing about the longitudinal axis. The first member has an external thread at a first end, where the external thread engages the conductor lug. The second member is rotatable with respect to the housing about the longitudinal axis and has an internal thread at the first end. The first end is open so that the internal thread can engage the stud.

In some embodiments either alone or together with any one or more of the aforementioned and/or after-mentioned embodiments, the first and second members are not movable with respect to one another along the longitudinal axis.

In some embodiments either alone or together with any one or more of the aforementioned and/or after-mentioned embodiments, the tap plug also includes a guide member connected to the first member at the first end by a releasable connection.

In some embodiments either alone or together with any one or more of the aforementioned and/or after-mentioned embodiments, the guide member closes the first end prior to release of the releasable connection and opens the first end after release of the releasable connection.

In some embodiments either alone or together with any one or more of the aforementioned and/or after-mentioned embodiments, the releasable connection, before being released, provides simultaneous rotation of the first member and the guide member about the longitudinal axis but prevents axial movement of the guide member with respect to the first member along the longitudinal axis.

In some embodiments either alone or together with any one or more of the aforementioned and/or after-mentioned embodiments, the releasable connection, after being released, allows movement of the guide member with respect to the first member along the longitudinal axis.

In some embodiments either alone or together with any one or more of the aforementioned and/or after-mentioned embodiments, the releasable connection comprises at least one pin, wherein, upon breakage of the pin(s), the guide member is movable from the first member along the longitudinal axis.

In some embodiments either alone or together with any one or more of the aforementioned and/or after-mentioned embodiments, the guide member further includes a second external thread corresponding to the external thread of the first member.

In some embodiments either alone or together with any one or more of the aforementioned and/or after-mentioned embodiments, the second member includes a torque application region at the second end.

In some embodiments either alone or together with any one or more of the aforementioned and/or after-mentioned embodiments, the first member is electrically conductive.

In some embodiments either alone or together with any one or more of the aforementioned and/or after-mentioned embodiments, the housing has an inner conductive layer that is electrically conductive in electrical communication with the first member.

In some embodiments either alone or together with any one or more of the aforementioned and/or after-mentioned embodiments, the first member and the guide member are formed as a unitary, one-piece member.

In some embodiments either alone or together with any one or more of the aforementioned and/or after-mentioned embodiments, the one-piece member has a thin frangible joint configured to shear the one combined member into the first member and the guide member when a sufficient torque is applied to the guide member.

In some embodiments either alone or together with any one or more of the aforementioned and/or after-mentioned embodiments, the housing, the first member, and the second member are formed of materials having similar coefficients of thermal expansion and/or of aluminum alloys.

A tap plug for engaging a lug of a conductor and a stud of an electric device is also provided. The tap plug includes a housing, a first member, a second member, a guide member, and a torque application region. The housing has an inner bore defining a longitudinal axis. The first member is in the inner bore and is rotatable with respect to the housing about the longitudinal axis. The first member has an external thread at a first end, where the external thread is configured to engage the lug. The second member is in the first member and is rotatable with respect to the housing about the longitudinal axis. The second member has an internal thread at a first end, where the internal thread can engage the stud. The guide member is connected to the first member at the first end by a releasable connection. The guide member closes the first end prior to release of the releasable connection and opens the first end after release of the releasable connection such that the internal thread is configured to engage the stud. The torque application region is defined in the guide member such that application of an application torque above a limit releases the releasable connection to allow movement of the guide member with respect to the first member along the longitudinal axis.

In some embodiments either alone or together with any one or more of the aforementioned and/or after-mentioned embodiments, the guide member further includes a second external thread corresponding to the external thread of the first member.

In some embodiments either alone or together with any one or more of the aforementioned and/or after-mentioned embodiments, the guide member is sized and configured to ensure that the second external thread engages the lug before the plug's insulating surface contacts the mating connector.

In some embodiments either alone or together with any one or more of the aforementioned and/or after-mentioned embodiments, the first member and the guide member are formed as a unitary, one-piece member.

In some embodiments either alone or together with any one or more of the aforementioned and/or after-mentioned embodiments, the one-piece member has a thin frangible joint configured to shear the one combined member into the first member and the guide member when a sufficient torque is applied to the guide member.

In some embodiments either alone or together with any one or more of the aforementioned and/or after-mentioned embodiments, the torque application region has a length sufficient to allow for application of a torque of at least 45 foot-pound and/or has a length that is at least 25% and less than 60% of an overall length of the second member.

An electrical connection assembly is provided that includes a conductor, an electric device, and a tap plug. The conductor has a lug with a first internal thread. The electric device has a stud with a first external thread at one end and a second external thread at a second, opposite end. The first and second external threads have a different thread length from one another along a longitudinal axis. The tap plug has a third external thread threadably engaged with the first internal thread of the lug. The tap plug also includes a second internal thread threably engaged with the first external thread of the stud. The second external thread is threadably engaged with the electric device. The first and second external threads have at least one additional different characteristic from one another.

In some embodiments either alone or together with any one or more of the aforementioned and/or after-mentioned embodiments, the at least one additional different characteristic is selected from a group consisting of a thread pitch, a thread angle, a pitch diameter, a major diameter, a minor diameter, and any combinations thereof.

In some embodiments either alone or together with any one or more of the aforementioned and/or after-mentioned embodiments, the tap plug includes a housing, a first member, a second member, and a torque application region. The housing has an inner bore defining the longitudinal axis. The first member is in the inner bore and is rotatable with respect to the housing about the longitudinal axis. The first member includes the third external thread at a first end. The second member is in the first member and is rotatable with respect to the housing about the longitudinal axis. The second member includes the second internal thread at the first end. The torque application region is at a second end of the second member.

In some embodiments either alone or together with any one or more of the aforementioned and/or after-mentioned embodiments, the first member is formed as a unitary, one-piece member.

In some embodiments either alone or together with any one or more of the aforementioned and/or after-mentioned embodiments, the one-piece member includes a thin frangible joint configured to shear the one-piece member into the first member and a guide member when a sufficient torque is applied to the guide member.

In some embodiments either alone or together with any one or more of the aforementioned and/or after-mentioned embodiments, the torque application region has a length sufficient to allow for application of a torque of at least 45 foot-pounds.

In some embodiments either alone or together with any one or more of the aforementioned and/or after-mentioned embodiments, the torque application region has a length that is at least 25% and less than 60% of an overall length of the second member.

In some embodiments either alone or together with any one or more of the aforementioned and/or after-mentioned embodiments, the torque application region has a length that is at least 33% and less than 40% of an overall length of the second member.

In some embodiments either alone or together with any one or more of the aforementioned and/or after-mentioned embodiments, the first member is electrically conductive.

In some embodiments either alone or together with any one or more of the aforementioned and/or after-mentioned embodiments, the housing has an inner conductive layer that is electrically conductive in electrical communication with the first member.

In some embodiments either alone or together with any one or more of the aforementioned and/or after-mentioned embodiments, the housing, the first member, and the second member are formed of materials having similar coefficients of thermal expansion.

In some embodiments either alone or together with any one or more of the aforementioned and/or after-mentioned embodiments, the housing, the first member, and the second member are formed of aluminum alloys.

In some embodiments either alone or together with any one or more of the aforementioned and/or after-mentioned embodiments, the lug and/or the stud are formed of aluminum alloys.

The above-described and other features and advantages of the present disclosure will be appreciated and understood by those skilled in the art from the following detailed description, drawings, and appended claims.

DETAILED DESCRIPTION

Figure 1:
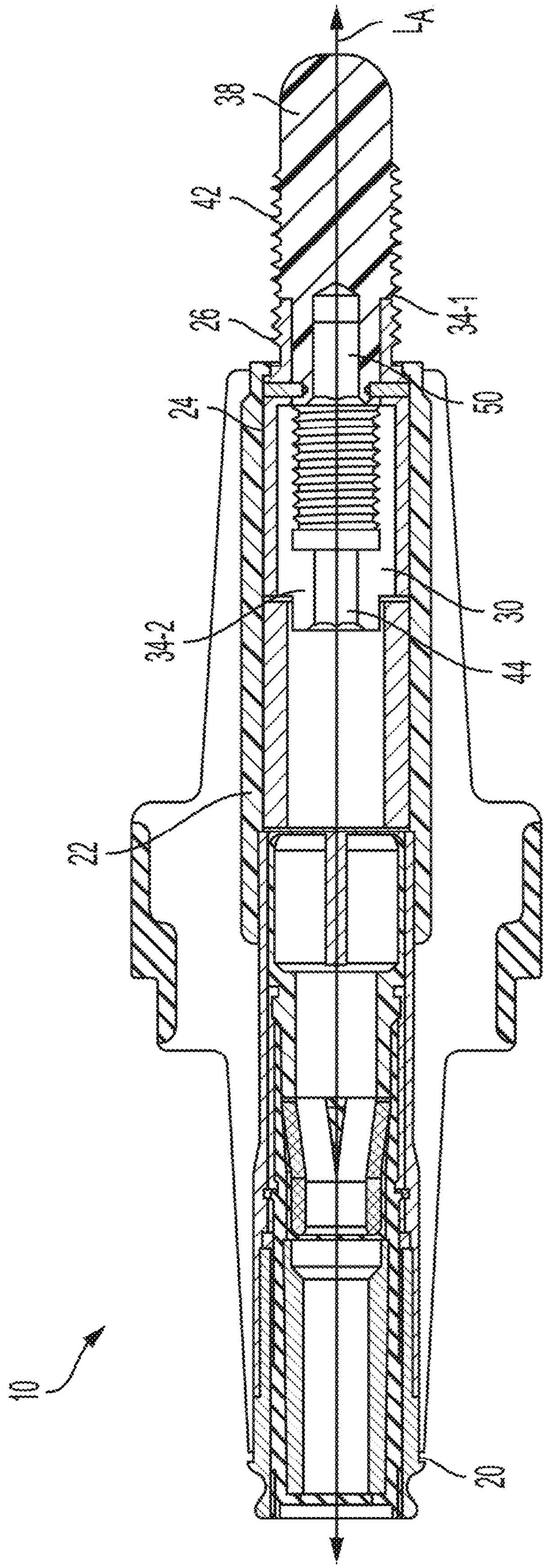
FIG. 1 is a sectional view of an exemplary embodiment of a tap plug according to the present disclosure before use.

Referring to the drawings and in particular to FIGS. 1, an exemplary embodiment of a tap plug according to the present disclosure is shown and is generally referred to by reference numeral 10. In some embodiments, tap plug 10 is a load reducing tap plug.

Figure 2:
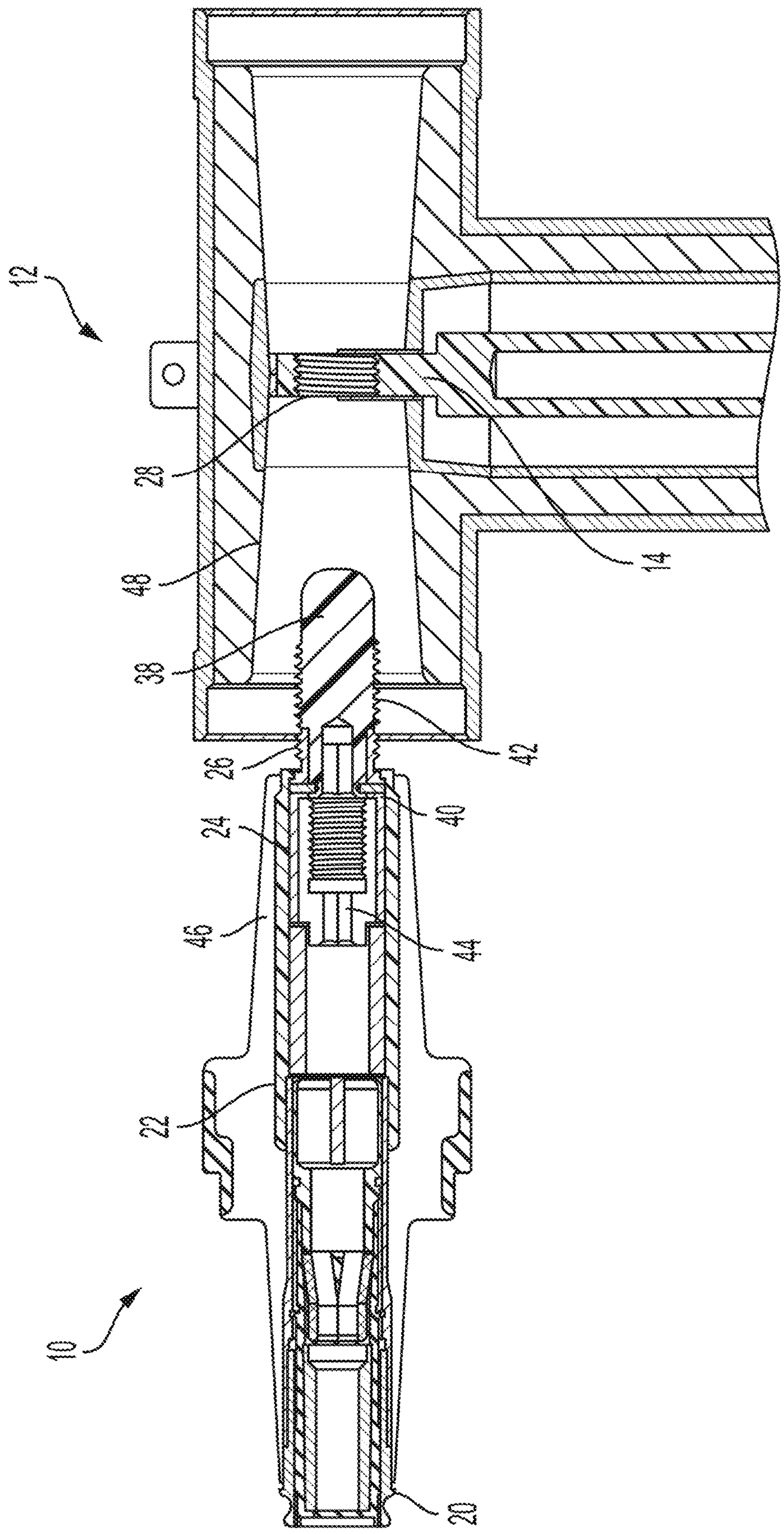
FIG. 2 is a view of the plug of FIG. 1 during installation into a T-body connector.
Figure 3:
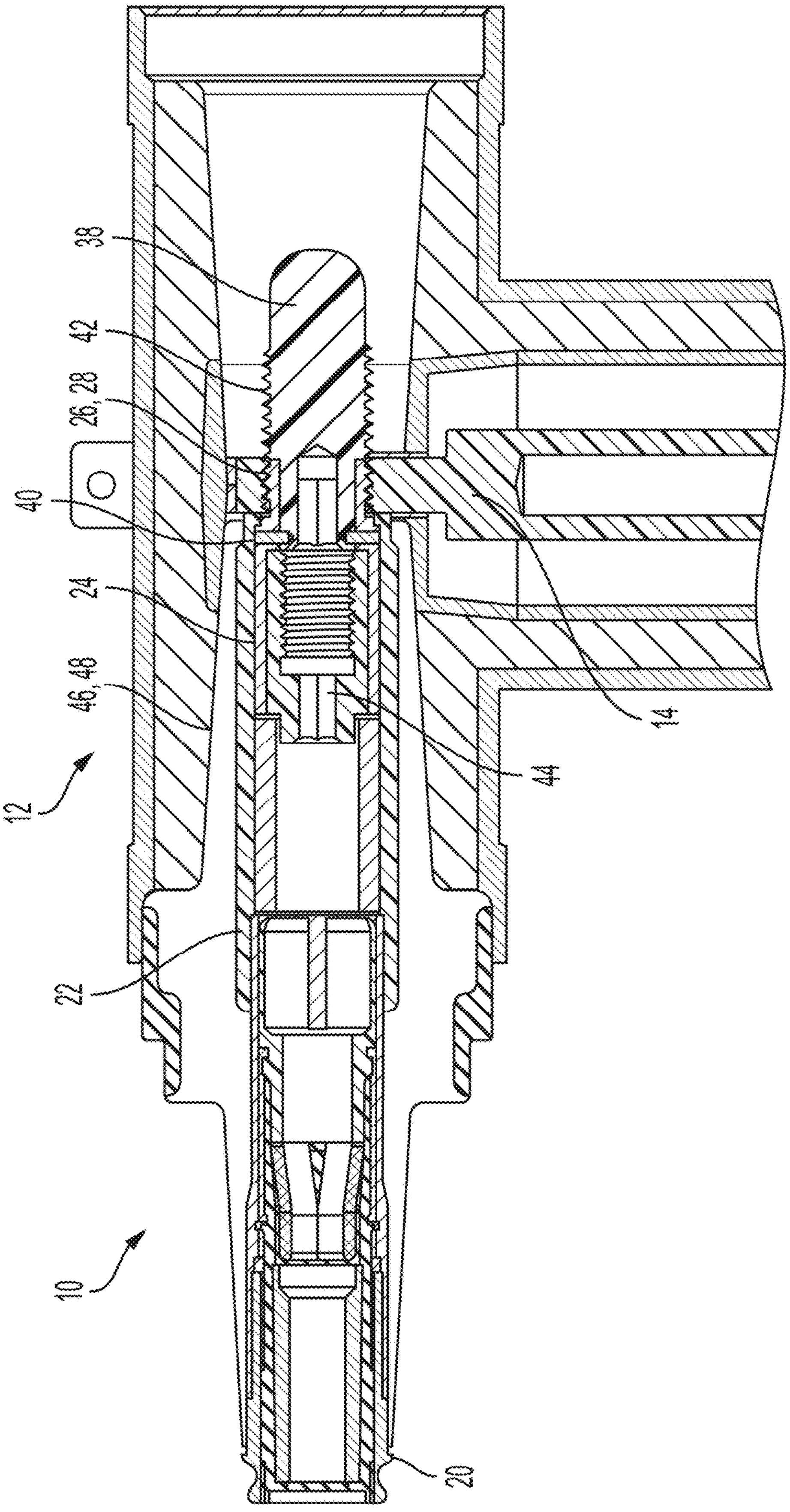
FIG. 3 is a view of the plug of FIG. 2 after installation into the T-body connector.

Plug 10 is configured for use with a T-body connector 12 as shown in FIG. 2 to mechanically and electrically connect the plug with a conductor lug 14.

Figure 5:
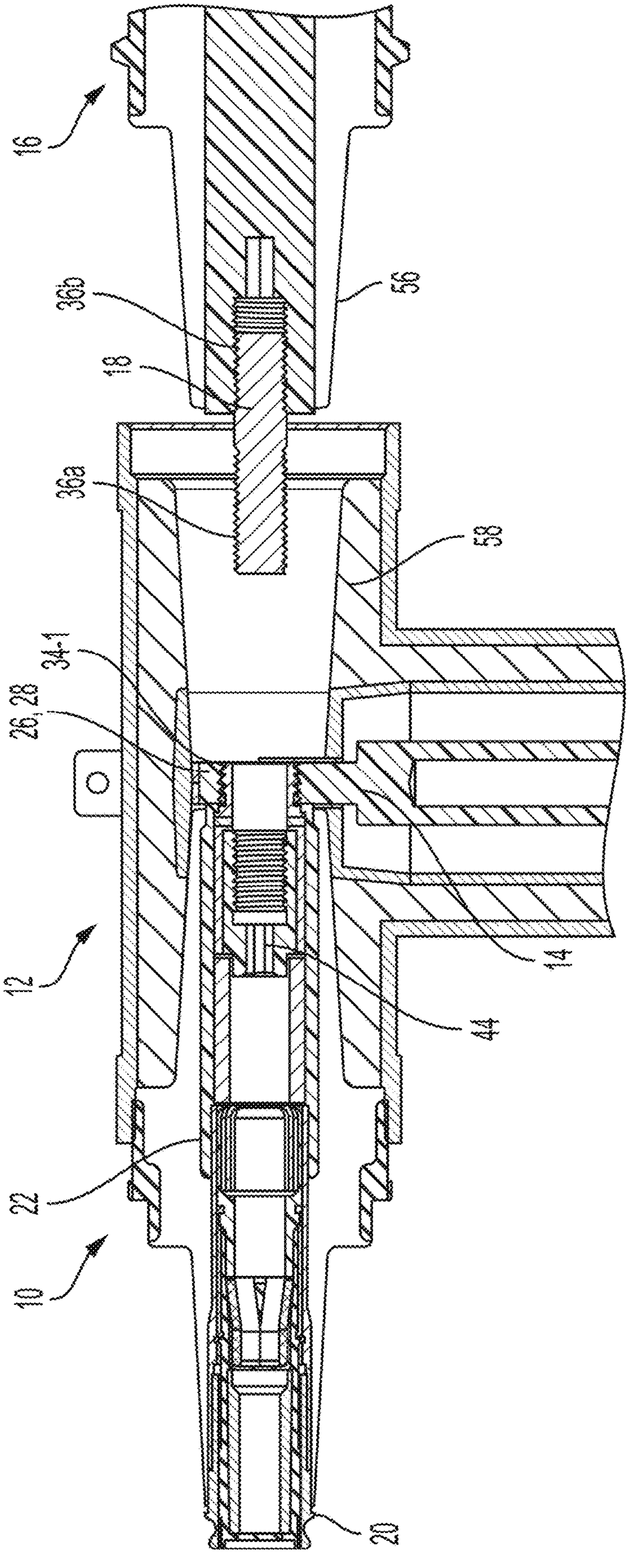
FIG. 5 is a sectional during insertion of a electric device into the T-body connector of FIG. 4.
Figure 6:
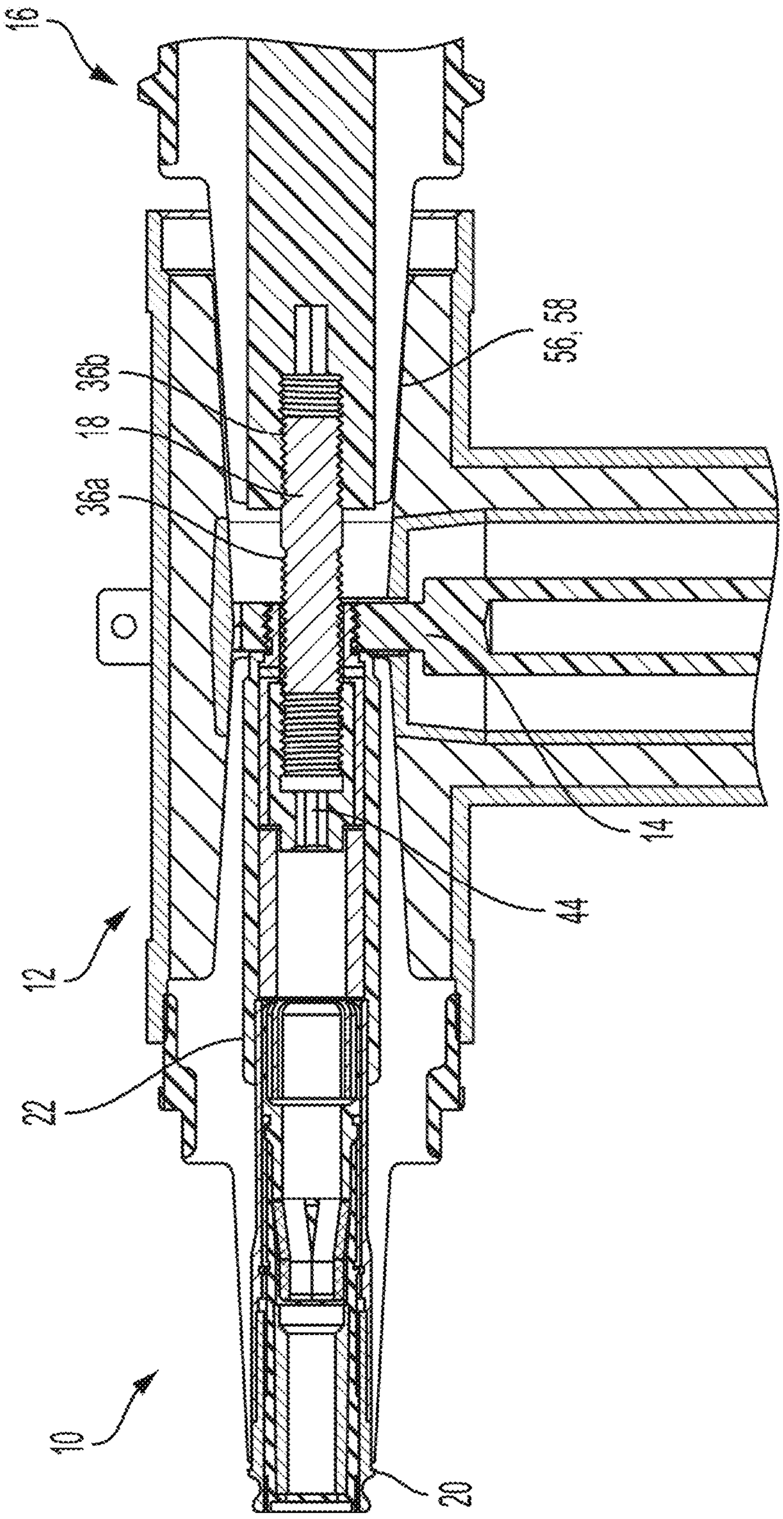
FIG. 6 is a sectional view during insertion of a stud of the electric device into the plug of FIG. 5.
Figure 7:
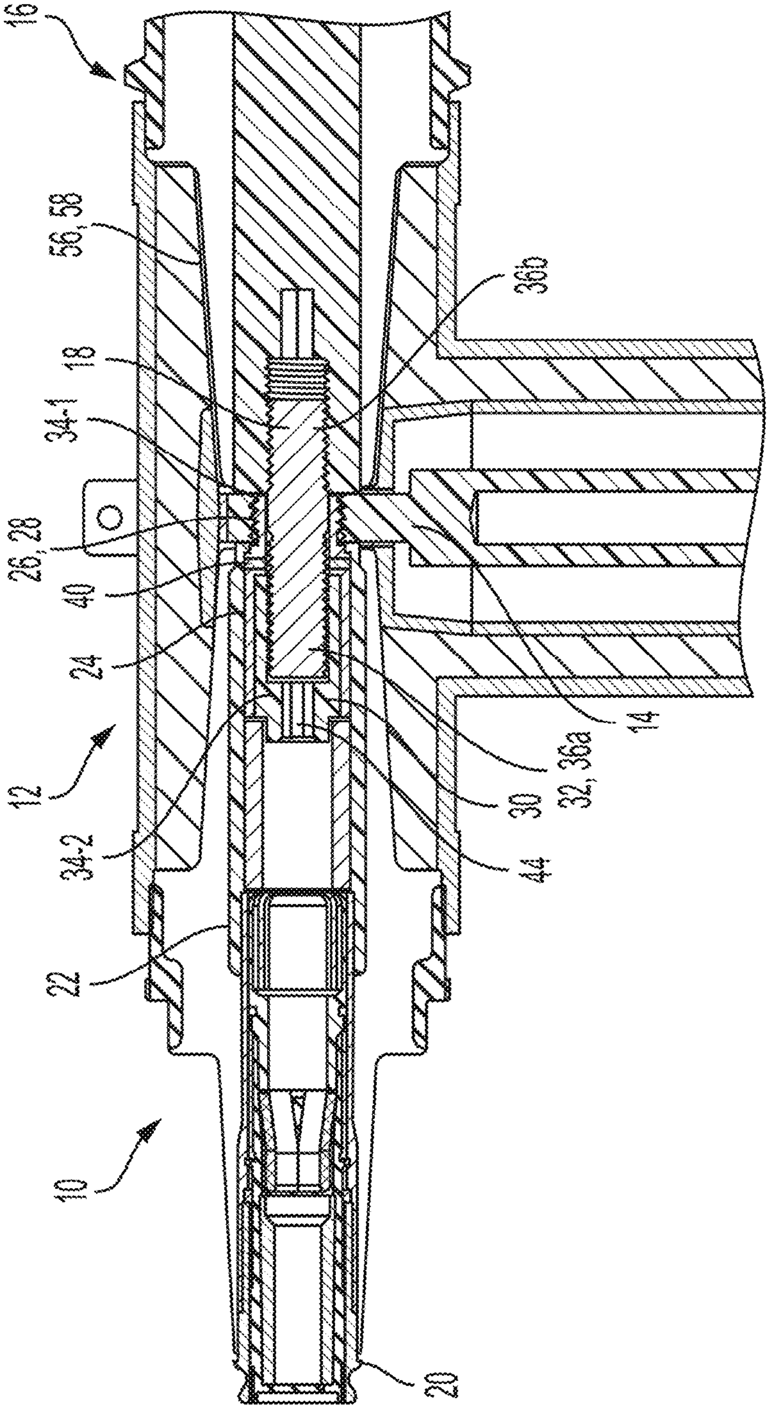
FIG. 7 is a sectional view after threading of the stud of the electric device into the plug of FIG. 6.

Further, plug 10 is configured for use with an electric device 16 as shown in FIGS. 5-7 to mechanically and electrically connect the plug with a stud 18 of the electric device. Device 16 can be any electrical equipment including, but not limited to, a transformer, switchgear, and others.

In examples where plug 10 is load reducing, the plug 10 can have any desired load reducing configuration such as, but not limited to, that disclosed in U.S. Pat. No. 6,520,795, which is incorporated herein by reference. Further, plug 10 includes one or more taps 20.

Advantageously and in this manner, plug 10 is configured to allows for testing at tap 20 of the connection between lug 14 of the conductor and stud 18 of electric device 16 at a significantly lower load than that present in the conductor.

Plug 10 and its assembly with T-body connector 12 and conductor lug 14 are described in more detail with simultaneous reference to FIGS. 1-7.

Plug 10 includes a housing 22 having an inner bore defining a longitudinal axis $L_A$. Plug 10 includes a first member 24 in housing 22. First member 24 is rotatable in housing 22 about axis $L_A$. First member 24 has an external thread 26 that is configured to engage a corresponding thread 28 in lug 14.

Plug 10 also includes a second member 30 in housing 22 that rotates about axis $L_A$ in housing 22. In some embodiments, first and second members 24, 30 are not movable with respect to one another along the axis. In these or other embodiments, housing 22 and first member 24 can form a unitary component or can be multiple components secured to one another.

Housing 22, first member 24, and second member 30 are in electrical communication with one another and can be made of any electrically conductive material. In some embodiments, housing 22 includes an inner electrically conductive layer defined thereon. For example, housing 22, first member 24, second member 30, and/or the inner conductive layer of the housing can be made of aluminum, copper, brass, aluminum alloy, copper alloy, and other conductive materials including conductive coatings such as, but not limited to, tin, gold, silver, copper, aluminum, and any alloys thereof.

In one embodiment, housing 22, first member 24, and second member 30 are formed of materials having similar coefficients of thermal expansion and, preferably are all formed of the same material so that the coefficients of thermal expansion match. In other embodiments, lug 14 and/or stud 18 are also formed of materials having similar coefficients of thermal expansion to those of housing 22, first member 24, and second member 30 and, more preferably are all formed of the same material so that the coefficients of thermal expansion match.

Second member 30 has an internal thread 32 that, when exposed via opening at first end 34-1 of first member 24, is configured to engage a corresponding thread **36*a* of stud 18**.

In order to ensure proper alignment of external threads 26 of first member 24 and threads 28 of lug 14, second member 30 can include, in some embodiments, a guide member 38. Here, guide member 38 is releasably connected to first member 24 at first end 34-1.

In the illustrated embodiment, guide member 38 extends into the opening at first end 34-1 and is connected to first member 24 by a releasable connection 40. Releasable connection 40 ensures simultaneous rotation of first member 24 and guide member 38 about axis $L_A$, but prevents movement of the guide member with respect to the first member along the axis.

Guide member 38 extends outward from first end 34-1 along axis $L_A$ a distance sufficient to engage threads 28 of lug 14 during installation of plug 10 into T-body connector 12 so as to provide mechanical advantage to draw the plug into the connector. In some embodiments, guide member 38 can also include a second external thread 42 that corresponding to external thread 26 of first member 24 to further assist in drawing plug 10 into connector 12.

Plug 10 includes an external contact region 46 that corresponds to an internal contact region 48 of connector 12. Once assembled, regions 46, 48 form a seal and, thus, are preferably made of polymer materials such as, but not limited to, rubber, EPDM, epoxy, plastic, or silicone. In some embodiments, regions 46, 48 have corresponding tapers along the axis $L_A$. During assembly, the tightening threads 26, 28, 42 draw plug 10 into connector 12 so that regions 46, 48 form the seal. It has been found that the seal aspect of plug 10 and connector 12 can cause issues with assembly as a result of, for example, high sliding friction between regions 46, 48 due to the shape and/or material properties of the regions.

Thus, guide member 38 is configured to ensure the threads 28, 42 make contact before regions 46, 48 make contact, which has been found by the present disclosure to increase the ease of assembly. Stated differently, plug 10 and connector 12 are advantageously configured to ensure thread-to-thread contact (threads 28, 42) before housing-to-housing (regions 46, 48) contact during assembly.

Guide member 38, when connected to first member 24, covers or otherwise makes inaccessible internal thread 32 of second member 30. Therefore, guide member 38 includes a releasable connection 40 that allows removal of the guide member from first member 24 after installation of plug 10 into connector 12 and before assembly of the connector onto electric device 16.

Guide member 38 includes a torque application region 50. The region 50 can be any region configured to apply torque to guide member 38 such as, but not limited to, a square or hexagonal opening. During installation of plug 10 into lug

14, a tool (not shown) is inserted along axis $L_A$ through first and second members 24, 30 and into engagement with region 50. In this manner, torque is applied to guide member 38 via torque application region 50, which transmits the torque through releasable connection 40 to rotate the first member 24 within housing 22 and threadably engaging external thread 26 and, second external thread 42, with corresponding thread 28 of lug 14. In this manner, plug 10 allows for rotation of first and guide members 24, 38 within housing 22 so that the plug itself does not require rotation within the T-body connector 12, instead allowing for installation using the tool engaged with region 50.

Releasable connection 40 is configured to release or break upon reaching a desired installation torque. In some embodiments, the desired installation torque is less than 30 foot-pounds, preferably between 20 to 25 foot-pounds.

Releasable connection 40 can be, for example, one or more shear pins 40 (two shown) that extend substantially perpendicular to axis $L_A$. In this embodiment where releasable connection 40 is one or more shear pins, the pins are configured to break at the desired installation torque.

It should be recognized that releasable connection 40 between first member 24 and guide member 38 is illustrated by way of example as one or more shear pins. Of course, it is contemplated by the present disclosure for releasable connection 40 between first member 24 and guide member 38 to be formed in any manner such as, but not limited to, an adhesive, a braze, a solder, a friction fit, a frangible section, and any combinations thereof.

Figure 8:
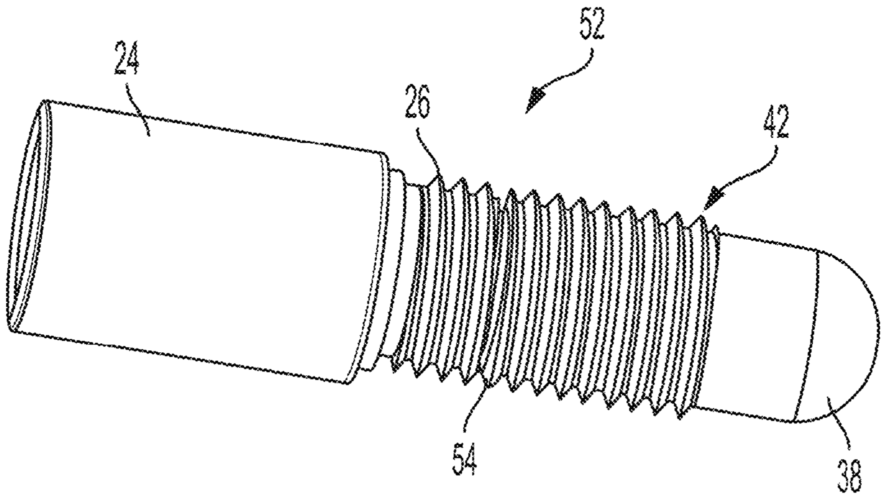
FIG. 8 is a perspective view of a one-piece member according to the present disclosure.
Figure 9:
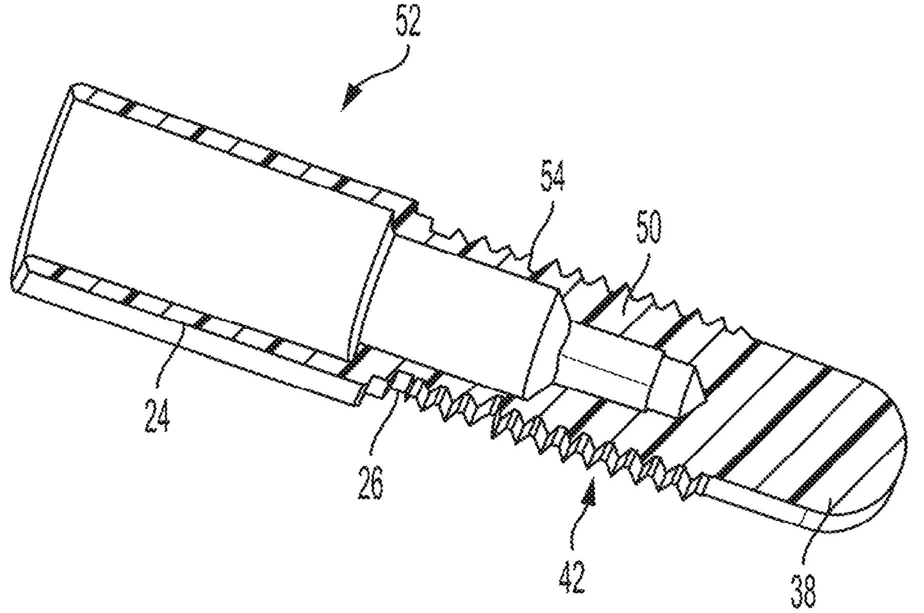
FIG. 9 is a sectional view of the one-piece member of FIG. 8.

For example and in the embodiment shown in FIGS. 8-9, first member 24 and guide member 38 could be formed as an integral or unitary, one-piece member 52 with the releasable connection 40 formed as a thin frangible section 54, which allows for the one-piece member to shear into the two separate pieces, namely first member 24 and guide member 38, once the desired torque is achieved.

Figure 4:
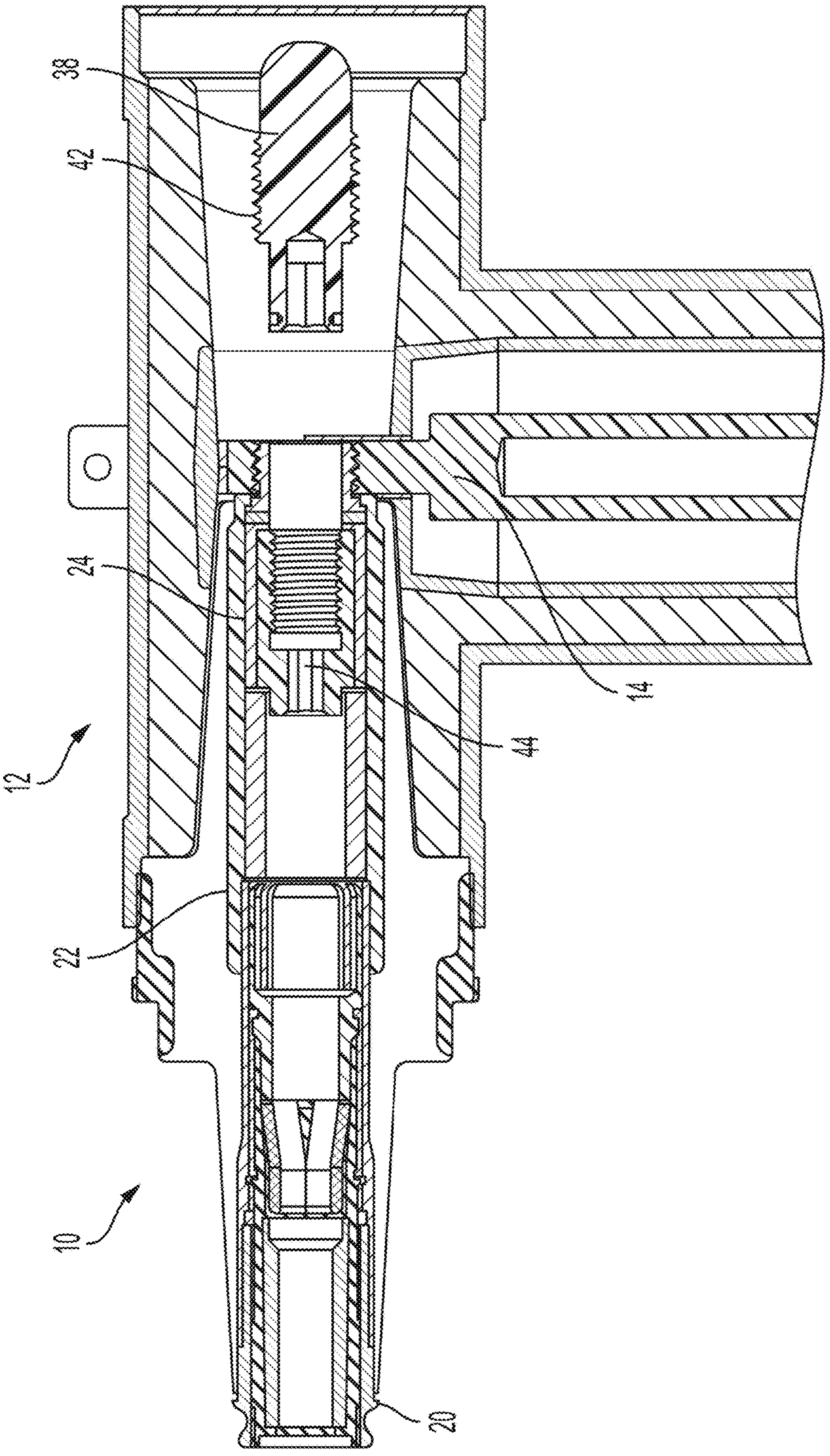
FIG. 4 is a view of the plug of FIG. 3 after removal of a guide member.

Upon release of releasable connection 40, guide member 38 can be removed from first member 24 as shown in FIGS. 4-5. After removal of connection 40, stud 18 of electric device 16 can be inserted through the opening at first end 34-1 of second member 30 (FIG. 6) and thread **36*a* of the stud can be engaged with internal thread 32 of the second member 30 (FIG. 7) to complete the assembly of plug 10, T-body connector 12, and electric device 16**.

Second member 30 includes a torque application region 44 defined at second end 34-2. The region 44 can be any region configured to apply torque to member 30 such as, but not limited to, a square or hexagonal opening. During installation of combined plug 10 and connector 12 onto electric device 16, a tool (not shown) is inserted along axis $L_A$ and into engagement with region 44. In this manner, plug 10 allows for rotation of the second member 30 within first member 24 so that the plug itself does not require rotation within the T-body.

Region 44 has a length along axis $L_A$ that provides sufficient contact between the tool and second member 30 to allow for higher torque applications then previously possible. In some embodiments, second member 30 is advantageously configured to apply an installation torque of at least 40 foot-pounds of torque to second member 30, more preferably at least 50 foot-pounds with at least 60 foot-pounds being most preferred. However, plug 10 has certain constraints such that an overall length of second member 30 cannot exceed certain dimensions.

Thus, it has been found by the present application that configuring second member 30 so that the length of region 44 is greater than a desired percent of the overall length of second member 30 balances these competing requirements. For example, the length of region 44 is preferably at least 25% and less than 60% of the overall length, more preferably at least 30% and less than 50%, with between at least 33% and less than 40% being most preferred.

Electrical device 16 includes an external contact region 56 that corresponds to an internal contact region 58 of connector 12. Once assembled, regions 56, 58 form a seal and, thus, are preferably made of polymer materials such as, but not limited to, rubber, epoxy, plastic, EPDM, or silicone. In some embodiments, regions 56B, 58 have corresponding tapers along the axis $L_A$. During assembly, the tightening threads 32, 36A draw connector 12 onto electrical device 16 so that regions 56B, 58 form the seal. It has been found that the seal aspect of connector 12 and connector 12 can cause issues with assembly as a result of, for example, high sliding friction between regions 56, 58 due to the shape and/or material properties of the regions.

Thus, stud 18 is asymmetric and longer on the 36A side. This makes stud 18 configured to ensure the threads 32, 36A make contact before regions 56, 58 make contact, which has been found by the present disclosure to increase the ease of assembly. Stated differently, connector 12 and electrical device 16 are advantageously configured to ensure thread-to-thread contact (threads 32, 36A) before housing-to-housing (regions 56, 58) contact during assembly.

Plug 10 is further configured, in some embodiments, to provide for easy removal of plug 10 from conductor lug 16. During installation of plug 10 into lug 14, a tool (not shown) is inserted along axis $L_A$ through first and second members 24, 30 and into engagement with region 44.

During removal of plug 10 from device 16 and connector 12, a tool (not shown) is inserted along axis $L_A$ into second member 30 and into engagement with region 44. In this manner, torque is applied to second member 30 via region 44, which threadably disengages internal thread 32 of second member 30 from corresponding thread **36*a* of stud 18. Since first member 24 and second member 30 cannot move axially with respect to one another, as the second member 30 is unthreaded from the stud 18, the entire whole connector 12 assembly separates from electrical device 16. This is advantageous because it uses the mechanical advantage of the threads to separate regions 56, 58. The silicone lubrication used to mate the regions becomes dry and sticky over time. This causes the regions 56, 58 to become adhered together and very difficult to separate. The mechanical advantage of the threads coupled with the second member 30 not being moveable axially with respect to first member 24 provides leverage to easily separate regions 56, 58** when stuck together.

In some embodiments, thread **36*a* of stud 18 remains engaged with internal thread 32 of second member 30 during removal so that the stud is removed from electric device 16 during removal of plug 10 from connector 14. Here, a thread 36*b* of stud 18 threadably disengages from device 16**.

Stud 18 is shown having thread **36*a* at a first end and thread 36*b* at a second, opposite end. Preferably, threads 36*a*, 36*b* have a different length along axis $L_A$ from one another. For example, thread 36*a* can be longer than or shorter than thread 36*b* along axis $L_A$. Moreover, in some embodiments, threads 36*a*, 36*b* have at least one additional different characteristic from one another, which ensures proper assembly of stud 18 into plug 10 and device 16 with the threads 36*a*, 36*b* facing then proper directions. The additional characteristic can include one or more of a thread pitch, a thread angle, pitch diameter, major diameter, minor diameter, metric versus imperial thread, and others. Stated differently, manufacturing stud 18 with a different thread on each end prevents stud 18 from accidently being installed backwards in service. If stud 18 is installed backwards, at a minimum the assembly/disassembly advantages are compromised, and in the worst case a backwards stud 18** can cause a loose electrical connection and premature product failure. Putting a metric thread on one side and an imperial thread on the other, for instance, prevents the backwards condition.

The present application includes an embodiment of an electrical connection assembly that includes a conductor having a lug having a first internal thread; an electric device having a stud with a first external thread at one end and a second external thread at a second, opposite end, the first and second external threads having a different thread length from one another along a longitudinal axis; and a tap plug, the tap plug having a third external thread threadably engaged with the first internal thread of the lug, the tap plug having a second internal thread threably engaged with the first external thread of the stud, wherein the second external thread is threadably engaged with the electric device, and wherein the first and second external threads have at least one additional different characteristic from one another.

In this embodiment of the electrical connection assembly, the at least one additional different characteristic is selected from a group consisting of a thread pitch, a thread angle, a pitch diameter, a major diameter, a minor diameter, and any combinations thereof.

In this embodiment of the electrical connection assembly, the tap plug includes a housing having an inner bore defining the longitudinal axis; a first member in the inner bore and being rotatable with respect to the housing about the longitudinal axis, the first member having the third external thread at a first end; a second member in the first member, the second member is rotatable with respect to the housing about the longitudinal axis, the second member having the second internal thread at the first end; and a torque application region at a second end of the second member.

In this embodiment of the electrical connection assembly, the first member is a unitary, one-piece member.

In this embodiment of the electrical connection assembly, the one-piece member has a thin frangible joint configured to shear the one-piece member into the first member and a guide member when a sufficient torque is applied to the guide member.

In this embodiment of the electrical connection assembly, the torque application region has a length sufficient to allow for application of a torque of at least 45 foot-pounds.

In this embodiment of the electrical connection assembly, the torque application region has a length that is at least 25% and less than 60% of an overall length of the second member.

In this embodiment of the electrical connection assembly, the torque application region has a length that is at least 33% and less than 40% of an overall length of the second member.

In this embodiment of the electrical connection assembly, the first member is electrically conductive.

In this embodiment of the electrical connection assembly, the housing has an inner conductive layer that is electrically conductive in electrical communication with the first member.

In this embodiment of the electrical connection assembly, the housing, the first member, and the second member are formed of materials having similar coefficients of thermal expansion.

In this embodiment of the electrical connection assembly, the housing, the first member, and the second member are formed of aluminum alloys.

In this embodiment of the electrical connection assembly, the lug and/or the stud are formed of aluminum alloys.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

PARTS LIST load reducing tap plug 10
T-body connector 12
conductor lug 14
electric electric device 16
stud 18
taps 20
housing 22
longitudinal axis $L_A$
first member 24
external thread 26
corresponding thread 28
second member 30
internal thread 32
first end 34-1
second end 34-2
thread **36*a***
thread **36*b***
guide member 38
releasable connection 40
second external thread 42
torque application region 44
external contact region 46
internal contact region 48
guide member torque application region 50
one-piece member 52
frangible section 54
external contact region 56
internal contact region 58

What is claimed is:

1. A tap plug for engaging a conductor lug and a stud, the plug comprising:

a housing having an inner bore defining a longitudinal axis;

a first member in the inner bore and being rotatable with respect to the housing about the longitudinal axis, the first member having an external thread at a first end, the external thread is configured to engage the conductor lug;

a second member being rotatable with respect to the housing about the longitudinal axis and having an internal thread at the first end, the first end being open so that the internal thread is configured to engage the stud; and a guide member integrally connected to the first member by a thinned section, the thinned section being configured to shear the guide member from the first member when a sufficient torque is applied to the guide member.

2. The plug of claim 1, wherein the first and second members are not movable with respect to one another along the longitudinal axis.

3. The plug of claim 1, wherein the guide member closes the first end prior to the shear of the guide member and opens the first end after the shear of the guide member.

4. The plug of claim 1, wherein the thinned section, before being sheared, provides simultaneous rotation of the first member and the guide member about the longitudinal axis but prevents axial movement of the guide member with respect to the first member along the longitudinal axis.

5. The plug of claim 1, wherein the thinned section, after being sheared, allows movement of the guide member with respect to the first member along the longitudinal axis.

6. The plug of claim 1, wherein the guide member further comprises a second external thread corresponding to the external thread of the first member.

7. The plug of claim 1, wherein the second member includes a torque application region at a second end.

8. The plug of claim 1, wherein the first member is electrically conductive.

9. The plug of claim 8, wherein the housing has an inner conductive layer that is electrically conductive in electrical communication with the first member.

10. The plug of claim 1, wherein the housing, the first member, and the second member are formed of materials having similar coefficients of thermal expansion and/or formed of aluminum alloys.

11. A tap plug for engaging a lug of a conductor and a stud of an electric device, the plug comprising:

a housing having an inner bore defining a longitudinal axis;

a first member in the inner bore and being rotatable with respect to the housing about the longitudinal axis, the first member having an external thread at a first end, the external thread is configured to engage the lug; and a second member in the first member, the second member is rotatable with respect to the housing about the longitudinal axis, the second member having an internal thread at a first end, the internal thread being configured to engage the stud;

a guide member connected to the first member at the first end by a releasable connection, the guide member closing the first end prior to release of the releasable connection and opening the first end after release of the releasable connection such that the internal thread is configured to engage the stud; and a torque application region defined in the guide member such that application of an application torque above a limit releases the releasable connection to allow movement of the guide member with respect to the first member along the longitudinal axis, wherein the torque application region has a length that is at least 25% and less than 60% of an overall length of the second member.

12. The plug of claim 11, wherein the guide member further comprises a second external thread corresponding to the external thread of the first member.

13. The plug of claim 12, wherein the guide member is sized and configured to ensure that the second external thread engages the lug before the plug's insulating surface contacts the mating connector.

14. The plug of claim 11, wherein the first member and guide member are formed as a unitary, one-piece member.

15. The plug of claim 14, wherein the one-piece member comprises a thin frangible joint configured to shear the one combined member into the first member and the guide member when a sufficient torque is applied to the guide member.

16. The plug of claim 11, wherein the torque application region has a length sufficient to allow for application of a torque of at least 45 foot-pound and/or has the length that is at least 33% and less than 40% of an overall length of the second member.

* * * * *